(12) United States Patent
Kojo

(10) Patent No.: US 9,151,626 B1
(45) Date of Patent: Oct. 6, 2015

(54) VEHICLE POSITION ESTIMATION SYSTEM

(71) Applicant: Nissan North America, Inc., Franklin, TN (US)

(72) Inventor: Naoki Kojo, Sunnyvale, CA (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 14/251,015

(22) Filed: Apr. 11, 2014

(51) Int. Cl.
*G01C 21/00* (2006.01)
*G01C 21/30* (2006.01)
*G06K 9/00* (2006.01)
*G01C 21/36* (2006.01)

(52) U.S. Cl.
CPC ............ *G01C 21/30* (2013.01); *G06K 9/00798* (2013.01); *G01C 21/3647* (2013.01)

(58) Field of Classification Search
CPC ........ G01C 21/30; G01C 21/28; G01C 21/34; G01C 21/3644; G01C 21/3647; G01C 21/3655; G05D 1/0246; G05D 1/0278; G06K 9/00798
USPC .......... 701/400, 411, 428, 523, 446; 340/988, 340/995.1
See application file for complete search history.

(56) References Cited

U.S. PATENT DOCUMENTS

| | | | | |
|---|---|---|---|---|
| 5,642,106 | A * | 6/1997 | Hancock et al. | 340/988 |
| 5,757,289 | A * | 5/1998 | Nimura et al. | 340/995.21 |
| 6,018,697 | A * | 1/2000 | Morimoto et al. | 701/411 |
| 2001/0056326 | A1* | 12/2001 | Kimura | 701/208 |

FOREIGN PATENT DOCUMENTS

JP 2013-185871 A 9/2013

* cited by examiner

*Primary Examiner* — Gertrude Arthur Jeanglaude
(74) *Attorney, Agent, or Firm* — Global IP Counselors, LLP

(57) ABSTRACT

A system for determining a position of a vehicle includes a camera, a marker, a storage device, an external parameter system, and a controller. The camera is configured to capture an image of an area adjacent the vehicle, the image including an edge. The marker detection device is configured to detect a marker in the area adjacent the vehicle. The storage device is configured to store map data, the stored map data including edge data. The positioning system is configured to determine the location of the vehicle relative to the stored map data. The controller is configured to combine the marker detected by the marker detection device and the edge in the image captured by the camera, and compare the combined marker detected by the marker detection device and the edge in the image captured by the camera to the stored map data.

20 Claims, 4 Drawing Sheets

US 9,151,626 B1

VEHICLE POSITION ESTIMATION SYSTEM

BACKGROUND

1. Field of the Invention

The present invention generally relates to an autonomous vehicle. More specifically, the present invention relates to a system for determining or estimating a position of an autonomous vehicle.

2. Background Information

Conventional vehicle position determination systems compute the position of a vehicle by comparing an image of a stored three dimensional map and a camera image. In particular, an edge image is extracted from the actual image acquired by a vehicle camera with which the vehicle is equipped. The position and attitude angle of the vehicle camera is adjusted so that a virtual image from a three dimensional map which recorded the position and type of edge of the environment by three dimensions is projected on the positional attitude of the vehicle camera. Accordingly, the position and attitude angle in three dimensional space of the vehicle camera can be estimated.

Moreover, successive images from cameras can be compared to determine the movement of the vehicle. Specifically, by comparing the location of a plurality of matching pixels from successive images, distance information can be obtained. The distance information can be compiled to determine movement of the vehicle in various directions and angles.

SUMMARY

It has been discovered that in vehicle position determination systems, expanding the matching target from an edge to specific markers, such as white line markers or stop line markers increases accuracy. That is, if pixels of extracted markers from an image match a marker from a virtual map, the pixel will be assigned a higher likelihood of being correct. Such a system results in increased accuracy for determination of position.

In one disclosed embodiment, a system for determining a position of a vehicle includes a camera, a marker, a storage device, a positioning system, and a controller. The camera is configured to capture an image of an area adjacent the vehicle; the image including an edge. The marker detection device is configured to detect a marker in the area adjacent the vehicle. The storage device is configured to store map data, the stored map data including edge data. The positioning system is configured to determine the location of the camera relative to the stored map data. The controller is configured to combine the marker detected by the marker detection device and the edge in the image captured by the camera, and compare the combined marker detected by the marker detection device and the edge in the image captured by the camera to the stored map data.

In another embodiment, a method for determining a position of a vehicle includes capturing an image of an area adjacent the vehicle, the image including an edge, detecting a marker in the area adjacent the vehicle, reading stored map data, the stored map data including edge data, determining the location of the vehicle relative to the stored map data, combining the detected marker and the edge in the image, and comparing the combined detected marker and the edge in the image captured by the camera to the stored map data.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

The disclosed embodiments are for a vehicle position determining or estimating system 12 (e.g., a vehicle map matching system) disposed on a host autonomous vehicle, and configured to determine or estimate the position of the host autonomous vehicle 10 relative to a virtual map. It is noted that the vehicle position determining system 12 may be used in non-autonomous vehicles, to assist drivers, if desired. The vehicle position determining system 12 enables detection of markers and edges adjacent the host vehicle 10 to accurately calculate the estimated position of the vehicle 10 relative to the virtual map.

Figure 1:
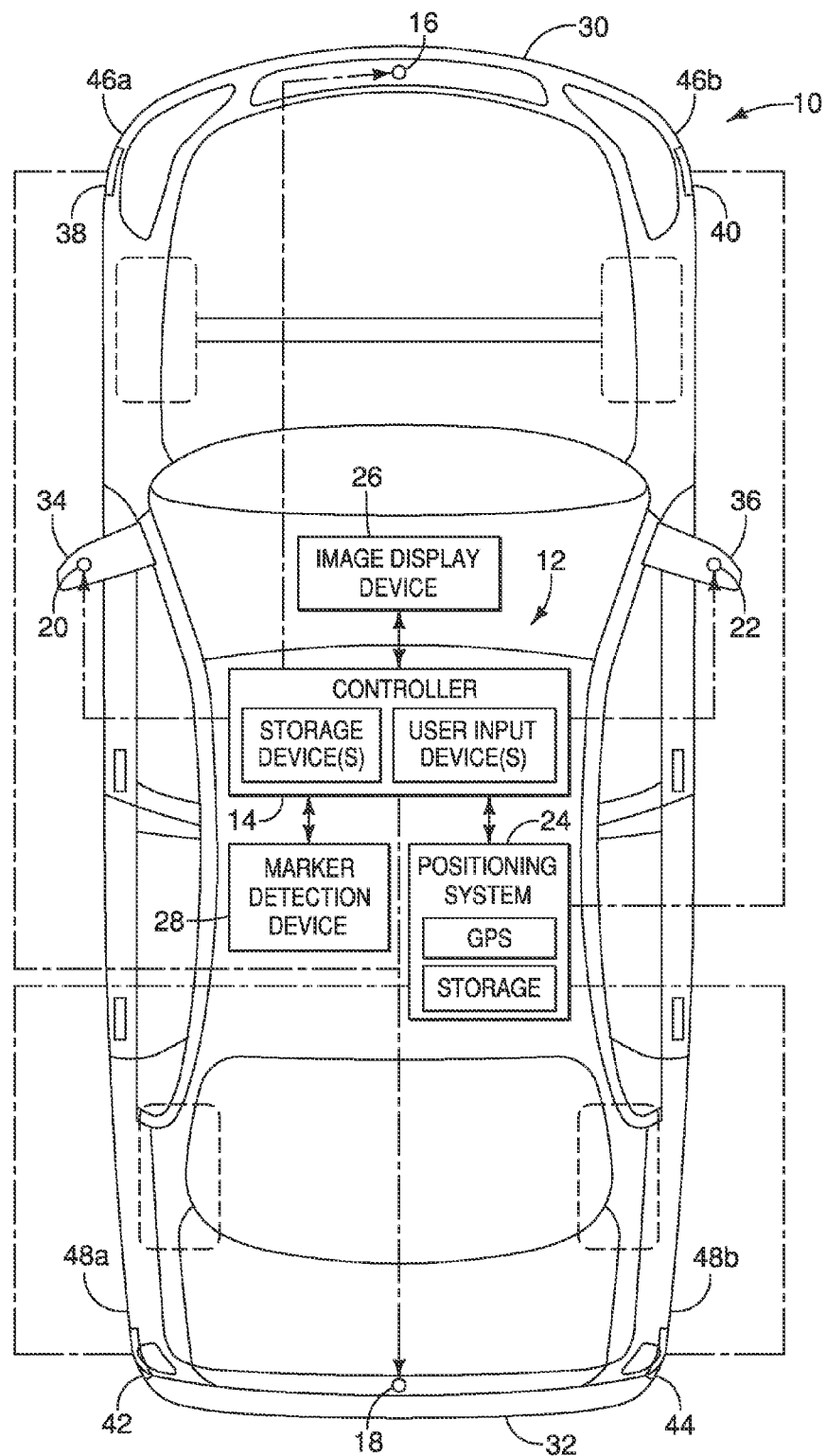
FIG. 1 is a schematic top view of an autonomous vehicle having a vehicle position determining system according to one embodiment.

Referring initially to FIG. 1, an autonomous vehicle 10 having a vehicle position determining system 12 is illustrated in accordance with a first embodiment. The vehicle position determining system 12 includes a controller 14, a plurality of cameras 16, 18, 20, 22, a positioning system 24, an image display device 26, and a marker detection device 28.

The controller 14 preferably includes a microcomputer with a control program that controls the vehicle position determining system 12 as discussed below. The controller 14 can also include other conventional components such as an input interface circuit, an output interface circuit, and storage devices such as a ROM (Read Only Memory) device and a RAM (Random Access Memory) device. The microcomputer of the controller 14 is programmed to control one or more of the plurality of cameras 16, 18, 20, 22, the image display device 26, the marker detection device 28 and the positioning system 24, and to make determinations or decisions, as discussed herein. The memory circuit stores processing results and control programs, such as ones for the plurality of cameras 16, 18, 20, 22, the image display device 26, the marker detection device 28 and the positioning system 24 operation that are run by the processor circuit. The controller 14 is operatively coupled to the plurality of cameras 16, 18, 20, 22, the image display device 26, the marker detection device 28 and the positioning system 24 in a conventional manner, as well as other electrical systems in the vehicle, such the turn signals, windshield wipers, lights and any other suitable systems. Such a connection enables the controller 14 to monitor and control any of these systems as desired. The internal RAM of the controller 14 stores statuses of operational flags and various control data. The internal ROM of the controller 14 stores the information for various operations. The controller 14 is capable of selectively controlling any of the components of the vehicle position determining system 12 in accordance with the control program. It will be apparent to those skilled in the art from this disclosure that the precise structure and algorithms for the controller 14 can be any combination of hardware and software that will carry out the functions of the present invention.

Figure 2:
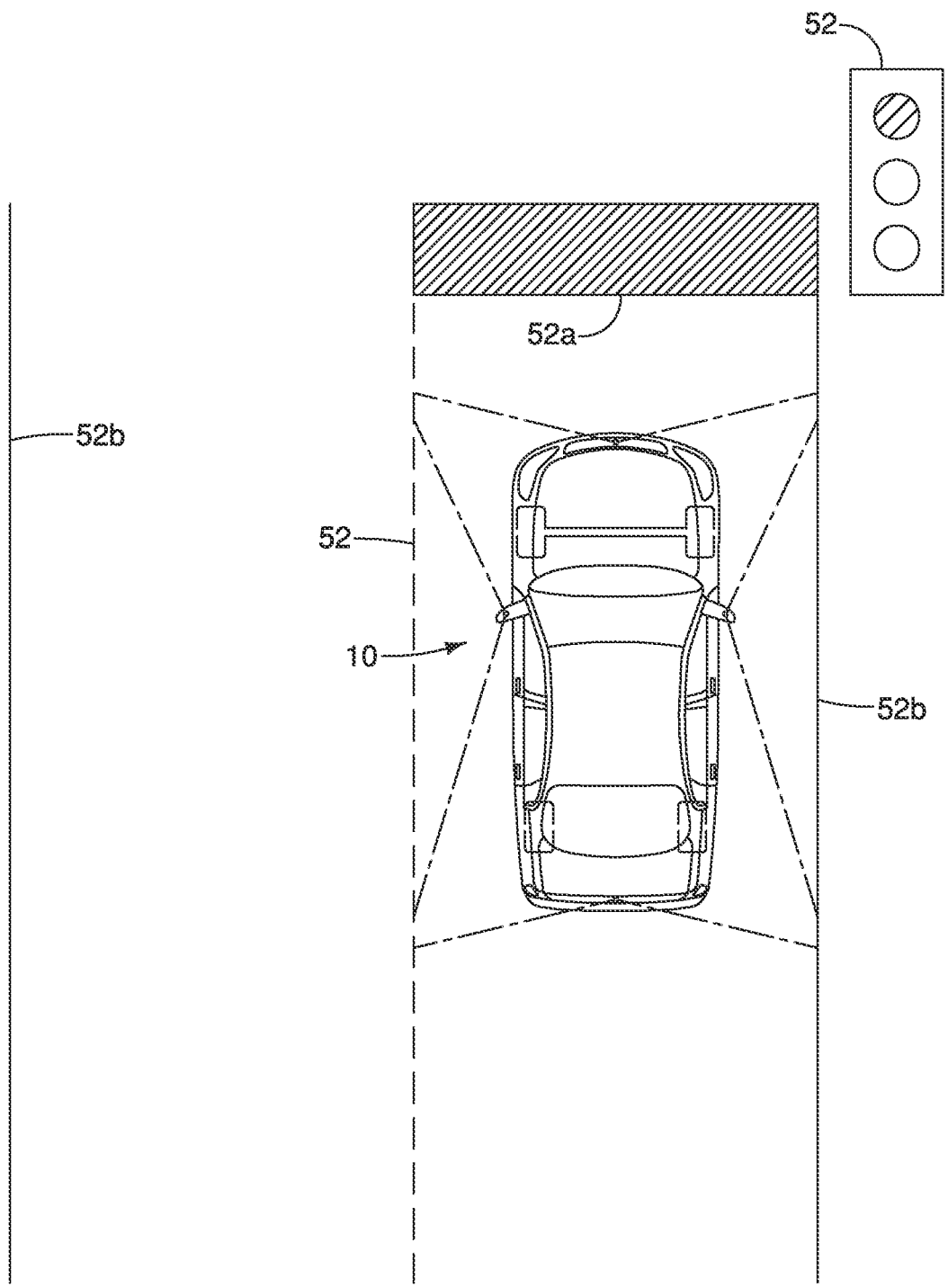
FIG. 2 is a top plan view of the vehicle of FIG. 1 illustrating camera views of vehicle position determining system according to one embodiment.

As illustrated in FIGS. 1 and 2, in one disclosed embodiment, a plurality of cameras 16, 18, 20, 22 (or optical sensors) are disposed on the external surface of the vehicle. It is noted that, although the optical sensors are preferably cameras 16, 18, 20, 22, the optical sensors may be any type of suitable optical sensors. In this embodiment, the cameras 16, 18, 20, 22 include four digital cameras disposed in a front 30 of the vehicle 10, a rear 32 of the vehicle 10, on the left side mirror 34 of the vehicle 10 and right side mirror 36. However, the cameras 16, 18, 20, 22 may be mounted on any suitable external portion of the host vehicle, including the front and rear quarter panels, or any combination of suitable areas. The cameras 16, 18, 20, 22 are preferably solid state image pickup devices, such as charge coupled device (CCD). Additionally, as illustrated in FIG. 2, the cameras 16, 18, 20, 22 are arranged around the vehicle 10 and have lenses that enable imaging substantially surrounding or completely surrounding the host vehicle 10 (e.g., fish-eye cameras 16, 18, 20, 22, which have an enlarged angular field).

In one embodiment, the positioning system 24 can include a plurality of vehicle sensors 38, 40, 42, and 44 that are configured to detect a remote object in proximity to the vehicle. For example, as illustrated in FIG. 1, the remote vehicle sensors 38, 40, 42, and 44 are preferably mounted externally on the front quarter panels 46a and 46b and rear quarter panels 48a and 48b of the vehicle 10. However, the sensors 38, 40, 42, and 44 may be mounted on any suitable external portion of the vehicle 10, including the front and rear bumpers, the external mirrors or any combination of suitable areas. The sensors 38, 40, 42, and 44 transmit data to the positioning system 24, which is then capable of using the sensor data to calculate the position of the vehicle 10 using odometry.

The vehicle sensors 38, 40, 42, and 44 can be any type of sensors desirable. For example, the front sensors can include a long-range radar device for object detection in front of the host vehicle. The front sensor may be configured to detect objects at a predetermined distance (e.g., distances up to 200 m), and thus may have a narrow field of view angle (e.g., around 15°). Due to the narrow field of view angle, the long range radar may not detect all objects in the front of the host vehicle. Thus, if desired, the front corner sensors can include short-range radar devices to assist in monitoring the region in front of the host vehicle. The rear sensors may include short-range radar devices to assist in monitoring oncoming traffic beside and behind the host vehicle. Placement of the aforementioned sensors permits monitoring of traffic flow including remote vehicles and other objects around the host vehicle, and the position of the vehicle 10 with respect to maintaining lane position or lane departure. However, the sensors 38, 40, 42, and 44 can be disposed in any position of the vehicle 10 and may include any type and/or combination of sensors to enable detection of a remote objects. In addition, the sensors may be cameras, radar sensors, photo sensors or any combination thereof. Although FIG. 1 illustrates four sensors, 38, 40, 42, and 44 there can be as few or as many sensors desirable or suitable.

Although sensors 38, 40, 42, and 44 preferably are electronic detection devices that transmit either electronic electromagnetic waves (e.g., radar), these sensors can be any suitable sensors that, for example, take computer-processed images with a digital camera and analyzes the images or emit lasers, as is known in the art. The sensors may be capable of detecting at least the speed, direction, yaw, acceleration and distance of the vehicle 10 relative to a remote object. Further, the sensors 38, 40, 42, and 44 may include object-locating sensing devices including range sensors, such as FM-CW (Frequency Modulated Continuous Wave) radars, pulse and FSK (Frequency Shift Keying) radars, sonar and Lidar (Light Detection and Ranging) devices, and ultrasonic devices which rely upon effects such as Doppler-effect measurements to locate forward objects. Object-locating devices may include charged-coupled devices (CCD) or complementary metal oxide semi-conductor (CMOS) video image sensors, and other known camera/video image processors which utilize digital photographic methods to "view" forward objects including one or more remote vehicles. The sensors are in communication with the controller 14 through position system 24, and are capable of transmitting information to the controller 14.

Moreover, as illustrated in FIGS. 1 and 2, the positioning system 24 may include a wireless communications device, such as a GPS. In one embodiment the vehicle 10 receives a GPS satellite signal. As is understood, the GPS processes the GPS satellite signal to determine positional information (such as location, speed, acceleration, yaw, and direction, just to name a few) of the vehicle 10. As noted herein, the positioning system is in communication with the controller 14, and is capable of transmitting such positional information regarding the vehicle 10 to the controller 14.

The positioning system 24 also can include a storage device that stores map data. Thus, in determining the position of the vehicle 10 using any of the herein described methods, devices or systems, the positioning of the vehicle 10 may be compared to the known data stored in the storage device. The storage device may also store any additional information including the current or predicted vehicle position and any past vehicle position or any other suitable information.

Preferably, the vehicle 10 is provided with a marker detection device 28 that detects the position of the vehicle 10 in the driving lane in order to detect the lane departure tendency of the host vehicle. The marker detection device 28 includes lane detection software in a lane departure device. The lane departure device generally includes an imaging device that has a picture processing function and preferably includes a camera. In one embodiment, the lane departure device may use cameras 16, 18, 20, 22. However, the cameras in the lane departure device can be suitable camera and may be a stand-alone camera or any one or more the cameras 16, 18, 20, 22. Thus, the imaging unit is designed to detect the position of the vehicle 10 in the driving lane in order to detect the lane departure tendency of the host vehicle. Moreover, as discussed herein, the lane departure device, is configured to detect markers on the road surface or any area adjacent the vehicle.

The controller 14 communicates with the imaging device in the lane departure device and is preferably configured and arranged to detect white lines or other markers, for example, from the imaging picture, preferably from the front of the vehicle 10. Thus, the driving lane is detected based on the detected lane markers. Furthermore, the imaging device can calculate the angle (yaw angle) formed by the driving lane of the vehicle 10 and the longitudinal axis of the vehicle 10, the lateral displacement from the center of the driving lane, the driving lane curvature, the lane width, and so forth. The imaging device outputs the calculated yaw angle, the calculated lateral displacement, the calculated driving lane curvature, the lane width, and the like to the controller 14.

Moreover, the vehicle position determining system 12 further includes a display device 26 (i.e., an image displaying device) that is mounted in an interior of the vehicle 10 such as in an instrument panel of the vehicle 10 as illustrated in FIG. 1. The display device 26 is configured and arranged to display the display image generated by the controller 14 for a driver of the vehicle. Thus, the display device 26 is operatively connected to the controller 14 in a conventional manner such as using wireless communication or wires such that the controller 14 can control the operations of the display device 26. More specifically, the controller 14 is configured to generate a video image including the regions directly forward, rearward and laterally of the vehicle 10 based on the images captured by the cameras 16, 18, 20, 22, and to display the generated image on the display device 26. Thus, the display device 26 is operatively connected to the cameras 16, 18, 20, 22 via the controller 14 to display images captured by the cameras 16, 18, 20, 22. In the illustrated embodiment, the controller 14 is programmed to process the images of the cameras 16, 18, 20, 22 to display a vehicle 10 peripheral view (i.e., a composite 360 degree top view image) around the vehicle.

Figure 3:
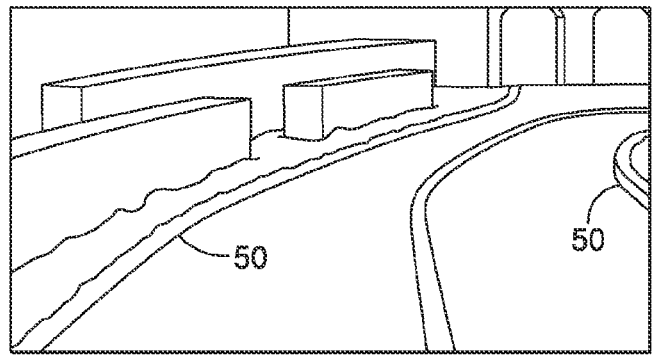
FIG. 3 is a schematic view of an image captured by a camera from the vehicle position determining system.

As illustrated in FIGS. 2 and 3, in one embodiment, at least one of the cameras 16, 18, 20, 22 captures an image of an area adjacent the vehicle. The image is formed from an array of pixels and preferably includes an edge 50 or a plurality of edges. An edge in this image may refer to a part of the image in which the luminance of a pixel sharply changes (e.g., curbs, lane markers or edges of roads). In one embodiment, the Canny edge detecting method may be used. However, it is noted that any suitable edge detection method or device may be used. The marker detection system then detects a marker 52 in the area adjacent the vehicle. As stated above, the marker 52 may be a white line, a stop line, traffic signal, car pool lanes (high occupancy vehicle 10 lanes), crosswalk or any other suitable marker. Further, if desired when there are two markers (i.e., a first marker 52a and a second marker 52b), as shown in FIGS. 2 and 3, the first marker being, for example, a stop line and the second marker being, for example, a line identifying the lane, the controller 14 can be configured to add more value to the pixel in the array of pixels that corresponds to the stop line. Thus, when there are multiple markers, the value of any desired marker can be more, less or equal to any other marker.

Figure 4:
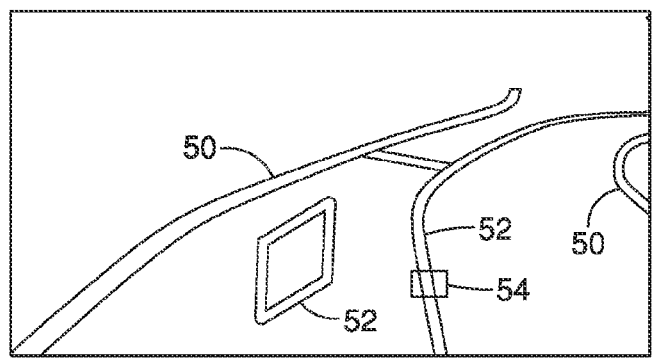
FIG. 4 is a schematic view of the image captured by the camera of FIG. 3 with the edge images illustrated.

As shown in FIG. 4, the controller 14 then combines the marker detected by the marker detection device 28 and the edges in the image captured by the camera. That is, the controller 14 compares information stored in the storage device in the positioning system 24 to the marker data and edges in the image captured by the camera.

The vehicle position determining system 12 determines the position of the vehicle 10 using the positioning system 24. That is, as would be understood, a resampling of a particle filter based on a previous predicted vehicle location can be used to determine vehicle location. Additionally, if desired, the positioning system 24 may use a GPS to determine the vehicle location, or any suitable system or method or combination of systems or methods. The controller 14 then predicts the position of the vehicle 10 based on odometry information. Such information may be acquired via the sensors or in any other suitable manner.

Figure 5:
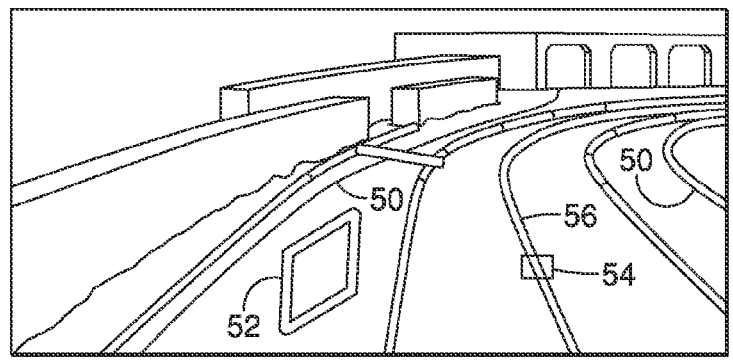
FIG. 5 is a schematic view of an image generated by a positioning system, including edge images.

Moreover, as shown in FIG. 5, the prediction of the vehicle location includes the controller 14 reading stored map data from the storage device and projecting a 3D map to a hypothetical camera. In this embodiment, the 3D map includes projected edge images. The controller 14 then compares the combined detected marker and the edge in the image captured by the camera to the 3D map from the stored map data. Since the vehicle position has been determined by the positioning system 24, the 3D map from the stored map data generally corresponds to the image captured by the camera.

Thus, in this embodiment, each pixel (e.g., pixel 54; see FIGS. 4 and 5) in the pixel array is compared to the 3D map. A value is given to each pixel in the camera image that matches a hypothetical pixel in the 3D map, and when the pixel 54 corresponds to a marker 52 additional value is added. That is, the controller 14 is configured to add value to a pixel 54 in the array of pixels that corresponds to the marker 52 when the pixel that corresponds to the marker matches a marker 56 in the image generated by the controller 14. Additionally, if desired, the controller 14 is configured to add value to a pixel in the array of pixels that corresponds to the edge when the pixel that corresponds to the edge matches an edge in the image generated by the controller 14.

Value may be added to both the position likelihood and the angular likelihood (i.e., the angle of the vehicle). In other words, the controller 14 determines whether at least one pixel from the combined detected marker and the edge in the image match a pixel from the stored map data. When at least one pixel from the combined detected marker and the edge in the image matches a pixel from the stored map data, value is added to the pixel. The controller 14 uses this date to calculate an estimated position of the vehicle. The value of the matching pixel may be adding to increase the predicted estimation of position likelihood and/or angular likelihood. When no pixels match the controller 14 restarts the process and causes the cameras 16, 18, 20, 22 to capture another image adjacent the vehicle.

In other words, the controller 14 estimates the position of the vehicle 10 and attitude angle using the three-dimensional image captured by the cameras 16, 18, 20, 22 and the three-dimensional map data stored in the storage device. For example, in one embodiment, the controller 14 compares the captured image imaged by the camera with a virtual image converted three dimensional map data to the image imaged from the virtual position and the virtual attitude angle, and estimates the position and attitude angle of the vehicle. The marker detected and the edge detected can be used to increase the likelihood of correct vehicle position estimation.

Figure 6:
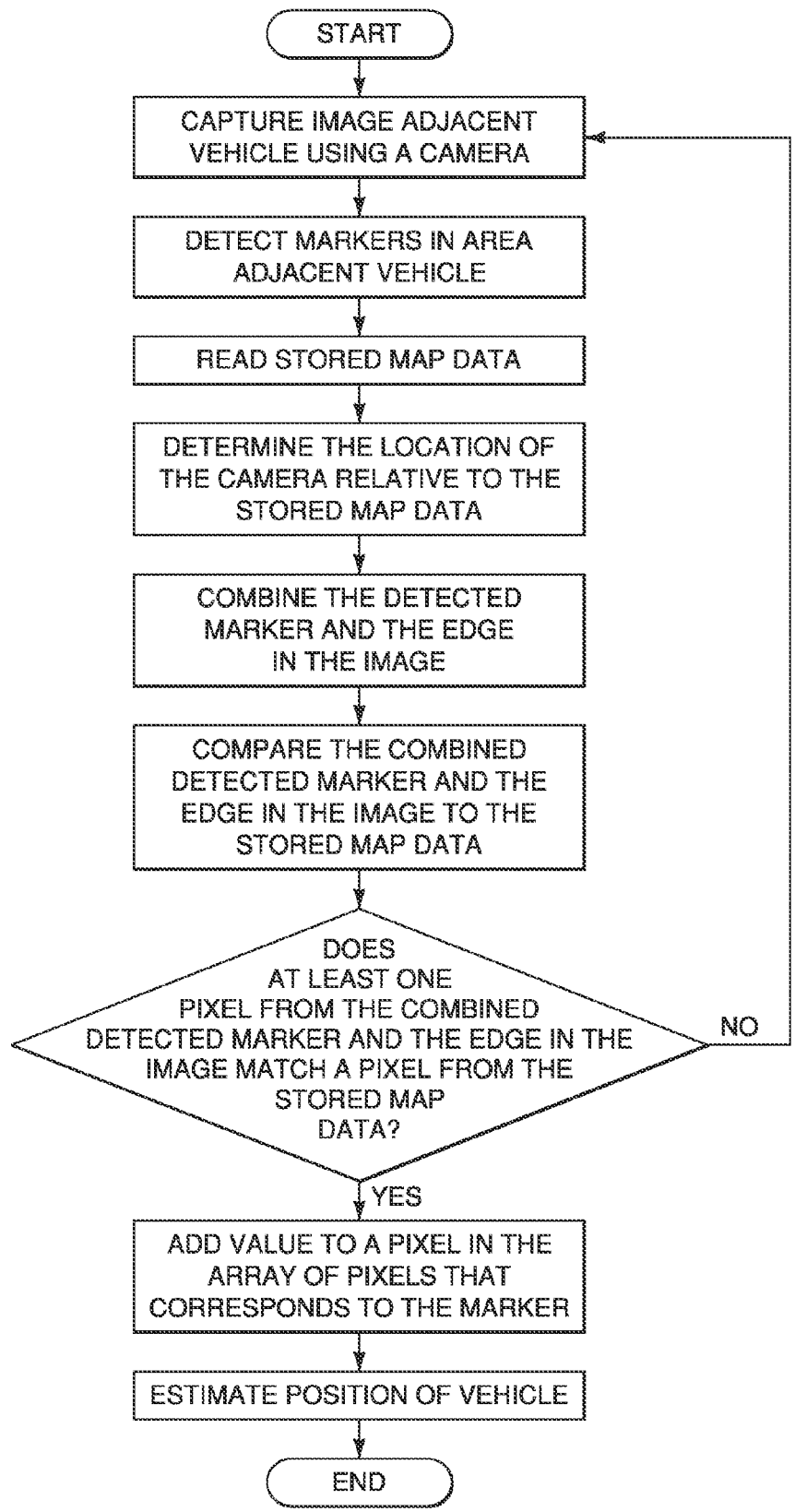
FIG. 6 is a flow chart illustrating steps executed by a controller according to a disclosed embodiment.

Basically, as illustrated in FIG. 6, the vehicle position determining system 12 captures an image adjacent the vehicle 10 using a camera. The marker detection device 28 detects markers 52 in an area adjacent the vehicle. The positioning system 24, reads map data stored in the storage device, and determines the location of the vehicle 10 relative to the stored map data. The controller 14 combines the detected marker 52 and the edge 50 in the image, and compares the combined detected marker 52 and the edge 50 in the image to the stored map data. If at least one pixel in the combined detected marker and the edge in the image does not match a pixel from the stored map data, the controller 14 instructs the cameras 16, 18, 20, 22 to capture another image, and restart the procedure. However, if at least one pixel 54 in the combined detected marker and the edge in the image does match a pixel from the stored map data, the controller 14 adds value to the pixel in the array of pixels that correspond to the marker or markers. The value can be related to position and/or vehicle angle. The estimated position of the vehicle 10 is then calculated. This vehicle position determining system 12 is capable of accurately estimating a position of an autonomous vehicle 10 or any other system or device.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," or "element" when used in the singular can have the dual meaning of a single part or a plurality of parts. Also as used herein to describe the above embodiment(s), the following directional terms "front", and "rear", as well as any other similar directional terms refer to those directions of a vehicle equipped with the vehicle position determining system. Accordingly, these terms, as utilized to describe the present invention should be interpreted relative to a vehicle equipped with the vehicle position determining system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A system for determining a position of a vehicle, comprising:
   a camera configured to capture an image of an area adjacent the vehicle, the image including an edge;
   a marker detection device configured to detect a marker in the area adjacent the vehicle;
   a storage device configured to store map data, the stored map data including edge data;
   a positioning system configured to determine the location of the vehicle relative to the stored map data, and
   a controller configured to combine the marker detected by the marker detection device and the edge in the image captured by the camera, and compare the combined marker detected by the marker detection device and the edge in the image captured by the camera to the stored map data.

2. The system according claim 1, wherein
   the controller is configured to estimate a position of the vehicle relative to the stored map data based on the comparison between the combined marker detected by the marker detection device and the edge in the image captured by the camera to the stored map data.

3. The system according claim 1, wherein
   the image captured by the camera includes an array of pixels, and the controller is configured to generate an image using the stored map data that corresponds to the image captured by the camera, and compare each of the pixels in the array of pixels to the image generated by the controller.

4. The system according claim 3, wherein
   the controller is configured to add value to a pixel in the array of pixels that corresponds to the marker when the pixel that corresponds to the marker matches an edge in the image generated by the controller.

5. The system according claim 4, wherein
   the marker is a stop line.

6. The system according claim 4, wherein
   the marker is a crosswalk.

7. The system according claim 4, wherein
   the marker is a an edge of a road.

8. The system according claim 4, wherein
   the marker is a traffic light.

9. The system according claim 4, wherein
   the marker is a line identifying a lane.

10. The system according claim 5, wherein
    the marker is one of a first marker and a second marker, the first marker being the stop line, the second marker being the line identifying the lane, and the controller is configured to add more value to the pixel in the array of pixels that corresponds to the first marker than the second marker.

11. The system according claim 1, wherein
    the positioning system includes a global positioning system.

12. The system according claim 1, wherein
    the positioning system includes a plurality of sensors.

13. The system according claim 1, wherein
    the marker detection device includes lane detection software in a lane departure device.

14. A system for determining a position of a vehicle, comprising:
    a camera configured to capture an image of an area adjacent the vehicle, the image including an edge and an array of pixels;
    a marker detection device configured to detect a marker in the area adjacent the vehicle;
    a storage device configured to store map data, the stored map data including edge data;
    a positioning system configured to determine the location of the vehicle relative to the stored map data, and
    a controller configured to combine the marker detected by the marker detection device and the edge in the image captured by the camera, and compare the combined marker detected by the marker detection device and the edge in the image captured by the camera to the stored map data, to generate an image using the stored map data that corresponds to the image captured by the camera, compare each of the pixels in the array of pixels to the image generated by the controller, and
    to add value to a first pixel in the array of pixels that corresponds to the edge when the first pixel that corresponds to the edge matches an edge in the image generated by the controller, such that first pixel is weighted more than a second pixel in the array of pixels in prediction estimation of the position of the vehicle.

15. The system according claim 14, wherein the edge is one of an edge of a road and a line identifying a lane.

16. A method for determining a position of a vehicle, the method comprising:
   capturing an image of an area adjacent the vehicle, the image including an edge;
   detecting a marker in the area adjacent the vehicle;
   reading stored map data, the stored map data including edge data;
   determining the location of the vehicle relative to the stored map data;
   combining the detected marker and the edge in the image; and
   comparing the combined detected marker and the edge in the image captured by the camera to the stored map data.

17. The method according claim 16, further comprising estimating a position of the vehicle relative to the stored map data based on the comparison between the combined detected marker and the edge in the image to the stored map data.

18. The method according claim 16, wherein the image includes an array of pixels, and generating an image using the stored map data that corresponds to the captured image, and comparing each of the pixels in the array of pixels to the generated image.

19. The method according claim 18, further comprising adding value to a pixel in the array of pixels that corresponds to the marker when the pixel that corresponds to a marker matches an edge in the generated image.

20. The system according claim 18, wherein adding value to a pixel in the array of pixels that corresponds to the edge when the pixel that corresponds to the edge matches an edge in the generated image.

* * * * *